United States Patent
Cao et al.

(10) Patent No.: US 10,026,154 B2
(45) Date of Patent: *Jul. 17, 2018

(54) SYSTEM AND METHOD FOR SUPPORTING IMAGE DENOISING BASED ON NEIGHBORHOOD BLOCK DIMENSIONALITY REDUCTION

(71) Applicant: SZ DJI TECHNOLOGY CO., LTD., Shenzhen (CN)

(72) Inventors: Zisheng Cao, Shenzhen (CN); Junping Ma, Shenzhen (CN); Xing Chen, Shenzhen (CN); Mingyu Wang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/619,121

(22) Filed: Jun. 9, 2017

(65) Prior Publication Data

US 2017/0337666 A1 Nov. 23, 2017

Related U.S. Application Data

(63) Continuation of application No. 15/349,773, filed on Nov. 11, 2016, now Pat. No. 9,773,297, and a (Continued)

(51) Int. Cl.
*G06K 9/00* (2006.01)
*G06T 5/00* (2006.01)
*G06T 5/20* (2006.01)

(52) U.S. Cl.
CPC ............... *G06T 5/002* (2013.01); *G06T 5/20* (2013.01); *G06T 2200/28* (2013.01); *G06T 2207/10024* (2013.01); *G06T 2207/20012* (2013.01)

(58) Field of Classification Search
CPC ........... G06T 5/20; G06T 5/002; G06T 7/408; G06T 2207/10024; G06T 2207/10012; G06T 2207/20182; H04N 19/61
See application file for complete search history.

(56) References Cited

U.S. PATENT DOCUMENTS

| 8,135,237 B2 | 3/2012 | Quan |
| 8,175,383 B2 | 5/2012 | Shiraishi et al. |

(Continued)

FOREIGN PATENT DOCUMENTS

| CN | 102930519 | 2/2013 |
| CN | 103020908 | 4/2013 |

(Continued)

OTHER PUBLICATIONS

International Search Report dated Sep. 30, 2015, issued by the State Intellectual Property Office of the P.R. China in counterpart International Application No. PCT/CN2015/079093; 4 pages.

(Continued)

*Primary Examiner* — Ali Bayat
(74) *Attorney, Agent, or Firm* — Finnegan, Henderson, Farabow, Garrett & Dunner, L.L.P.

(57) ABSTRACT

System and method can support an image processing device. The image processing device operates to obtain a first set of characterization values, which represents a first group of pixels that are associated with a denoising pixel in an image. Also, the image processing device can obtain a second set of characterization values, which represents a second group of pixels that are associated with a denoising reference pixel. Furthermore, the image processing device operates to use the first set of characterization values and the second set of characterization values to determine a similarity between the denoising pixel and the denoising reference pixel. Then, the image processing device can calculate a denoised value for the denoising pixel based on the determined similarity (Continued)

between the denoising pixel and the denoising reference pixel.

28 Claims, 11 Drawing Sheets

Related U.S. Application Data continuation of application No. PCT/CN2015/079093, filed on May 15, 2015.

(56) References Cited

U.S. PATENT DOCUMENTS

| | | | |
|---|---|---|---|
| 8,199,223 B2* | 6/2012 | Sasaki | G06K 9/6212 348/241 |
| 8,675,104 B2 | 3/2014 | Bosco et al. | |
| 8,818,126 B2 | 8/2014 | Shin et al. | |
| 9,002,136 B2* | 4/2015 | Artyomov | G06T 5/002 382/167 |
| 2007/0127836 A1 | 6/2007 | Subbotin | |
| 2008/0075394 A1 | 3/2008 | Huang et al. | |
| 2009/0128662 A1 | 5/2009 | Moon et al. | |
| 2009/0226085 A1 | 9/2009 | Shiraishi et al. | |
| 2009/0279808 A1* | 11/2009 | Shiraishi | G06T 5/002 382/275 |
| 2009/0324117 A1 | 12/2009 | Demandolx | |
| 2010/0259650 A1 | 10/2010 | Sasaki et al. | |
| 2011/0069886 A1 | 3/2011 | Chien et al. | |
| 2011/0069902 A1 | 3/2011 | Yang et al. | |
| 2011/0075935 A1 | 3/2011 | Baqai et al. | |
| 2011/0149122 A1 | 6/2011 | Subbotin | |
| 2011/0187902 A1 | 8/2011 | Adams, Jr. et al. | |
| 2012/0200754 A1 | 8/2012 | Fainstain et al. | |
| 2012/0224784 A1 | 9/2012 | Cohen et al. | |
| 2012/0244789 A1 | 9/2012 | Chatterjee et al. | |
| 2014/0118581 A1 | 5/2014 | Sasaki et al. | |
| 2014/0118582 A1 | 5/2014 | Artyomov et al. | |
| 2016/0132995 A1 | 5/2016 | Lin et al. | |
| 2017/0038931 A1 | 2/2017 | Murase | |

FOREIGN PATENT DOCUMENTS

| | | |
|---|---|---|
| CN | 103491280 | 1/2014 |
| CN | 103679639 | 3/2014 |
| CN | 103871035 | 6/2014 |
| CN | 103927729 | 7/2014 |
| CN | 104010114 | 8/2014 |
| CN | 104202583 | 12/2014 |
| JP | 2006-23959 | 1/2006 |
| JP | 2007-536662 | 12/2007 |
| JP | 2014-86956 | 5/2014 |

OTHER PUBLICATIONS

Written Opinion dated Sep. 30, 2015, issued by the State Intellectual Property Office of the P.R. China in counterpart International Application No. PCT/CN2015/079093; 4 pages.
Xing, L. et al., "The Algorithms about Fast Non-local Means Based Image Denoising", Acta Mathematicae Appplicatae Sinica, English Series, vol. 28, No. 2, pp. 247-254, (2012).
Zhang et al., "Color demosaicking by local directional interpolation and nonlocal adaptive threshading", Journal of Electronic Imaging, vol. 20, No. 2, 023016-1-16, (2011).
Losson, O. et al., "Comparison of Color Demosaicing Methods", Advancing in Imaging and Electron Physics, vol. 162, pp. 173-265, (2010).
English-language extended Search Report from the European Patent Office in counterpart European Application No. EP 15 87 4390.6 dated Jul. 3, 2017.
Notification of Reasons for Refusal from the Japanese Patent Office, in counterpart Japanese Application No. 2016-554733 dated Jul. 13, 2017.
Fukushima, "Non-local Means Filter," Oct. 31, 2011.
Notification of Reasons for Refusal from the Japanese Patent Office, in counterpart Japanese Application No. 2016-554733 dated Dec. 5, 2017.
Japanese Office Action dated May 8, 2018, by the Japanese Patent Office in counterpart Japanese Patent Application No. 2012016-554733.

* cited by examiner

| B | Gr | B |
|---|----|---|
| Gb | R | Gb |
| B | Gr | B |

Figure 5A

| Gb | R | Gb |
|----|---|----|
| B | Gr | B |
| Gb | R | Gb |

Figure 5B

| R | Gb | R |
|---|----|---|
| Gr | B | Gr |
| R | Gb | R |

Figure 5C

| Gr | B | Gr |
|----|---|----|
| R | Gb | R |
| Gr | B | Gr |

Figure 5D

SYSTEM AND METHOD FOR SUPPORTING IMAGE DENOISING BASED ON NEIGHBORHOOD BLOCK DIMENSIONALITY REDUCTION

CROSS-REFERENCE TO RELATED APPLICATIONS

This application is a continuation application of U.S. application Ser. No. 15/349,773, filed Nov. 11, 2016, which is a continuation application of International Application No. PCT/CN2015/079093, filed May 15, 2015, the entire contents of each are hereby incorporated by reference in their entireties.

BACKGROUND OF THE INVENTION

The disclosed embodiments relate generally to digital image signal processing and more particularly, but not exclusively, to image denoising.

With the development of faster and higher resolution image sensors, the modern camera becomes ever more versatile and powerful. For example, the charge-coupled device (CCD) and complementary metal-oxide-semiconductor (CMOS) image sensors, which are pixel based, are used extensively in the modern digital image system.

This is the general area that embodiments of the invention are intended to address.

BRIEF SUMMARY OF THE INVENTION

Described herein are systems and methods that can support an image processing device. The image processing device operates to obtain a first set of characterization values, which represents a first group of pixels that are associated with a denoising pixel in an image. Also, the image processing device can obtain a second set of characterization values, which represents a second group of pixels that are associated with a denoising reference pixel. Furthermore, the image processing device operates to use the first set of characterization values and the second set of characterization values to determine a similarity between the denoising pixel and the denoising reference pixel. Then, the image processing device can calculate a denoised value for the denoising pixel based on the determined similarity between the denoising pixel and the denoising reference pixel. Other objects and features of the present invention will become apparent by a review of the specification, claims, and appended figures.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings briefly described herein.

FIGS. 5 A-D illustrate different types of exemplary neighborhood blocks in an RGB image, in accordance with various embodiments of the present invention.

DETAILED DESCRIPTION OF THE INVENTION

Figure 1:
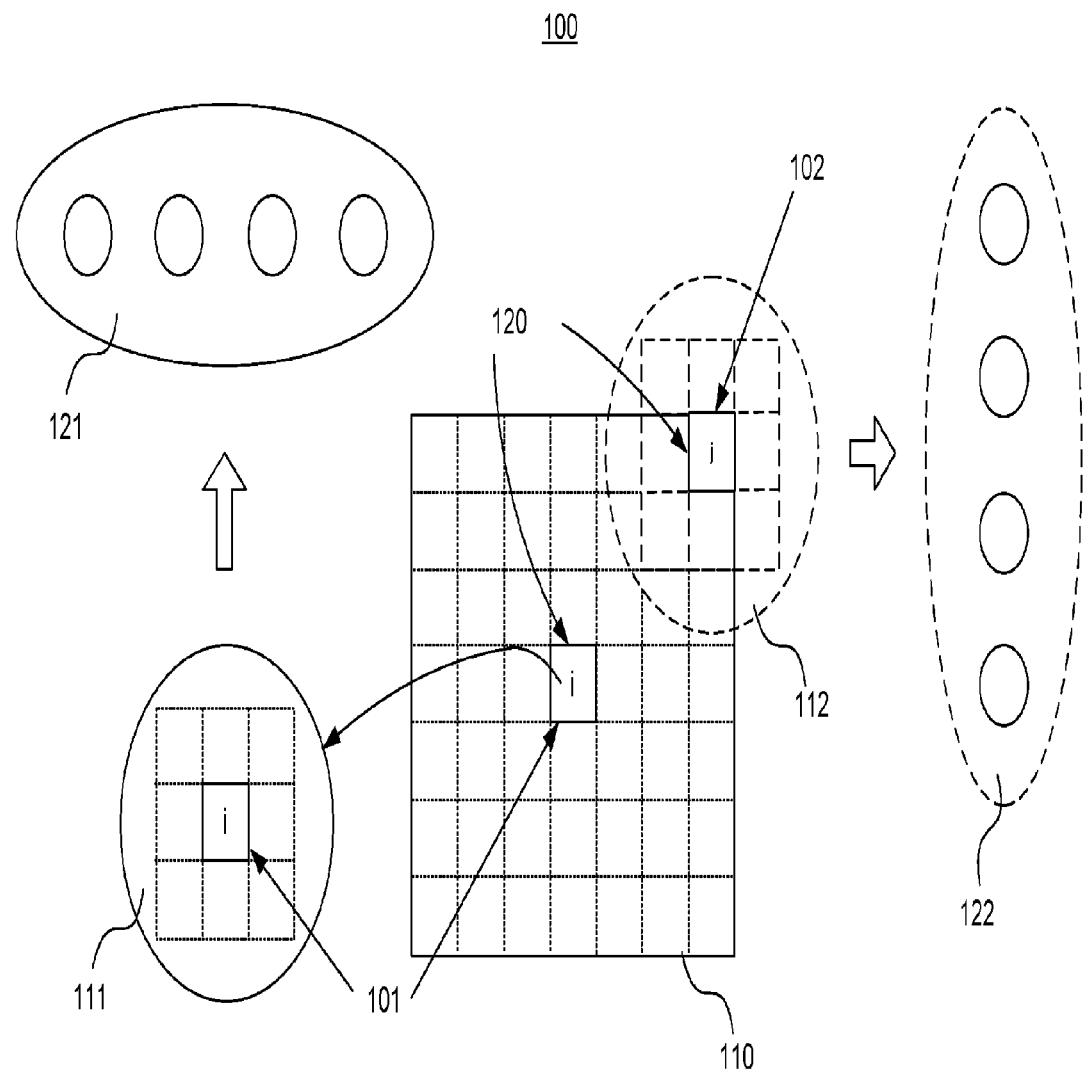
FIG. 1 is an exemplary illustration of supporting image denoising based on neighborhood block dimensionality reduction, in accordance with various embodiments of the present invention.

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The description of the invention as following uses an RGB image format as example for a digital image format. It will be apparent to those skilled in the art that other types of digital image formats can be used without limitation.

Image Denoising

The image collecting process can use image sensors for collecting various image information. For example, a color filter array (CFA), or a color filter mosaic (CFM) may be placed over the CCD and CMOS image sensors. The CFA or CFM involves a mosaic of tiny color filters, which are prone to introducing noise into the captured image.

In accordance with various embodiments of the present invention, an image process can perform various denoising operations on the captured images. The denoising operations can be either pixel-based or patch-based. The pixel-based denoising method, such as a bilateral filter method, is easy to implement, e.g. using the application-specific integrated circuit (ASIC). On the other hand, the patch-based denoising method, such as a non-local means algorithm, can be used for obtaining a digital image with better quality.

For example, the non-local means algorithm can be applied on a digital image (I) with noise (e.g., $v=\{v(i)|i \in I\}$), such as a denoising pixel (i) in the digital image (I). The value for the denoised image pixel, $NL[v](i)$, can be determined based on the weighted contribution by all other pixels in the image (I), using the following equation.

$$NL[v](i) = \sum_{j \in I} w(i,j) v(j)$$

The weight function w(i,j) for a denoising reference pixel (j) can satisfy the following weight conditions.

$$0 \leq w(i,j) \leq 1$$
$$\sum_{j \in I} w(i,j) = 1$$

Furthermore, the weight function w(i,j) for a denoising reference pixel (j) can be determined based on the similarity between the denoising pixel (i) and the denoising reference pixel (j).

For example, the similarity can be defined as the distance between two vectors, $v(\mathcal{N}_i)$ and $v(\mathcal{N}_j)$, whereas $\mathcal{N}_i$ is a multi-dimensional vector that represents a neighborhood block that is associated with (such as surrounding) the denoising pixel (i) and $\mathcal{N}_j$ is a multi-dimensional vector that represents a neighborhood block that is associated with the denoising reference pixel (j).

Thus, the weight function w(i,j) for the denoising reference pixel (j) can be determined using the following equation.

$$w(i,j) = \frac{1}{Z(i)} e^{-\frac{\|v(N_i) - v(N_j)\|_{2,a}^2}{h^2}}$$

Whereas, Z(i) is the normalization constant, which can be defined using the following equation.

$$Z(i) = \sum_{j \in I} e^{-\frac{\|v(N_i) - v(N_j)\|_{2,a}^2}{h^2}}$$

Neighborhood Block Dimensionality Reduction

FIG. 1 is an exemplary illustration of supporting image denoising based on neighborhood block dimensionality reduction, in accordance with various embodiments of the present invention. As shown in FIG. 1, an imaging process 100 can use a filter window 110 for denoising a pixel 101 in an image, e.g. a Bayer (mosaic) image.

In accordance with various embodiments of the present invention, the filter window 110 includes a plurality of denoising reference pixels (e.g. the pixel 102), which can be used for denoising the pixel 101.

When the filter window ($\Omega_i$) 110 is used for denoising a pixel (i) 101 in a digital image with noise (v={v(i)|i ∈ I}), the value of the denoised image pixel, (NL[v](i)), for the denoising pixel (i) 101 can be determined using the following equation.

$$NL[v](i) = \sum_{j \in \Omega_i} w(i,j) v(j)$$

The weight function w(i,j) can be determined based on the similarity 120 between the denoising pixel (i) 101 and a denoising reference pixel (j) 102 in the filter window ($\Omega_i$) 110.

For example, the similarity 120 can be defined as the distance between two vectors, $v(\mathcal{N}_i)$ and $v(\mathcal{N}_j)$, whereas $\mathcal{N}_i$ is a multi-dimensional vector that represents a neighborhood block 111 surrounding the denoising pixel (i) 101 and $\mathcal{N}_j$ is a multi-dimensional vector that represents a neighborhood block 112 surrounding the denoising reference pixel (j) 102.

In order to simplify the computation process, the weight function w(i,j) can be determined based on the rectilinear distance (i.e. the $L_1$ distance), using the following equation.

$$w(i,j) = \frac{1}{Z(i)} e^{-\frac{\|v(N_i) - v(N_j)\|_1}{h^2}}$$

Whereas, Z(i) is the normalization constant, which can be defined using the following equation.

$$Z(i) = \sum_{j \in \Omega_i} e^{-\frac{\|v(N_i) - v(N_j)\|_1}{h^2}}$$

In the example as shown in FIG. 1, the vectors, $v(\mathcal{N}_i)$ and $v(\mathcal{N}_j)$ are multi-dimensional vectors, since the neighborhood block 101 and the neighborhood block 102 are both three by three-by-three (3×3) blocks. Using the above equation, it may take seventeen (3×3+8) addition/subtraction operations for calculating the weight function w(i,j) for the denoising reference pixel (j). Thus, it may take eight hundred and thirty-three (17×7×7) operations to calculate the denoised value for the denoising pixel (i) 101 using the filter window ($\Omega_i$) 110, since the filter window ($\Omega_i$) 110 is a seven-by-seven (7×7) block.

In accordance with various embodiments of the present invention, the system can further reduce the computation cost for denoising a pixel 101 in an image by taking advantage of a neighborhood block dimensionality reduction feature.

As shown in FIG. 1, the system can use a characterization vector ($P_i$) 121, which includes a set of characterization values, for representing a group of pixels such as the pixels in the neighborhood block 111 associated with the denoising pixel (i) 101. Also, the system can use a characterization vector ($P_j$) 122, which includes a set of characterization values, for representing a group of pixels such as the pixels the neighborhood block 112 associated with the denoising pixel (j) 102. Additionally, the characterization vector ($P_i$) 121 and the characterization vector ($P_j$) 122 can be used for representing the pixels not restricted in regular neighborhood blocks, such as the pixels in irregular neighborhood blocks, neighborhood blocks with different sizes, or even discrete forms.

The weight function, w(i,j), which depends on the similarity between the denoising pixel (i) 101 and a denoising reference pixel (j) 102, can be defined as the distance between two characterization vectors, $P_i$ and $P_j$, using the following equation.

$$w(i, j) = \frac{1}{Z(i)} e^{-\frac{\|P_i - P_j\|_1}{h^2}}$$

Whereas, Z(i) is the normalization constant, which can be defined using the following equation.

$$Z(i) = \sum_{j \in \Omega_i} e^{-\frac{\|P_i - P_j\|_1}{h^2}}$$

In the case of an RGB image, both the characterization vectors ($P_i$ and $P_j$) may include four (4) color components. It may take seven (4+3) operations for the imaging process 100 to determine the similarity between the denoising pixel (i) 101 and a denoising reference pixel (j) 102. Thus, it may take three hundred forty-three (7×7×7) operations to calculate the denoised value for the denoising pixel (i) 101 using the filter window ($\Omega_i$) 110, which is a seven-by-seven (7×7) block.

Thus, by taking advantage of the neighborhood block dimensionality reduction feature, the system can significantly reduce the computation cost for determining the similarity between the denoising pixel (i) 101 and a denoising reference pixel (j) 102, and thereby reduces the computation cost for calculating the denoised value for the denoising pixel (i) 101 using the filter window ($\Omega_i$) 110.

Figure 2:
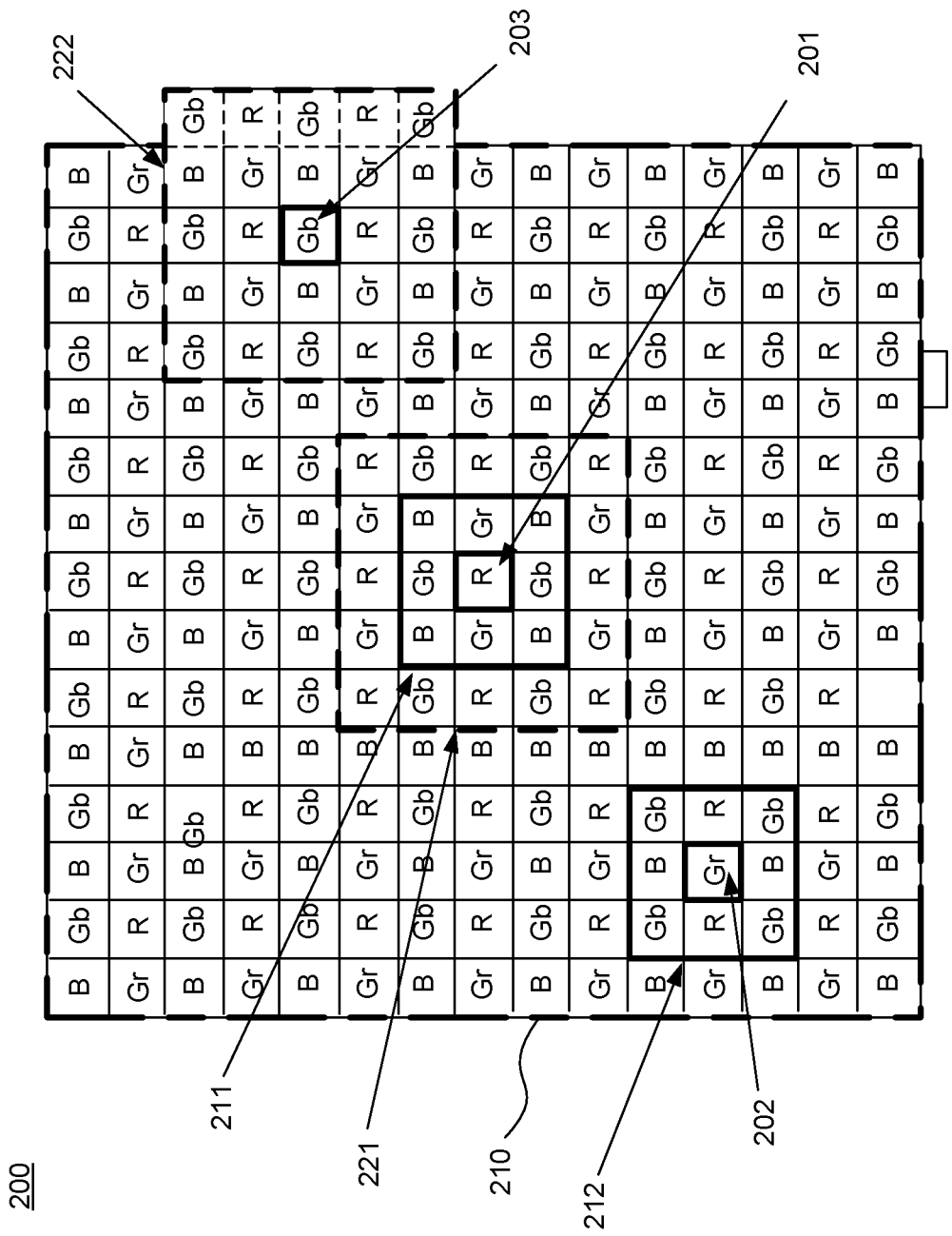
FIG. 2 is an exemplary illustration of a filter window for denoising a pixel in an RGB image, in accordance with various embodiments of the present invention.

FIG. 2 is an exemplary illustration of a filter window for denoising a pixel in an RGB image, in accordance with various embodiments of the present invention. As shown in FIG. 2, an imaging process can use a filter window 210 for performing a denoising operation on a denoising pixel 201 in an RGB image 200.

In accordance with various embodiments of the present invention, the denoising pixel 201 in the RGB image 200 may have different colors. In the example as shown in FIG. 2, the denoising pixel 201, which locates at the center of the filter window 210, is a red color pixel (R). In general, the denoising pixel 201 can be a red pixel (R), a blue pixel (B), or a green pixel (Gr or Gb) in the RGB image 200 without limitation.

As shown in FIG. 2, the determining of the similarity between the denoising pixel 201 and the denoising reference pixels (e.g. 202 and 203) can be based on the different neighborhood blocks (211-212 and 221-222).

The neighborhood blocks can be in different sizes. For example, the neighborhood blocks 211 and 212 are both three-by-three (3×3) blocks, while the neighborhood blocks 221 and 222 are both five-by-five (5×5) blocks. Also, the neighborhood block 222 may include pixels that are outside of the filter window 210.

Additionally, the neighborhood blocks may be in different geometry shapes, such as a polygon, a circle, an ellipse, or other regular shapes such as a cube, or a sphere. Also, the neighborhood blocks may be in various irregular shapes.

Figure 3:
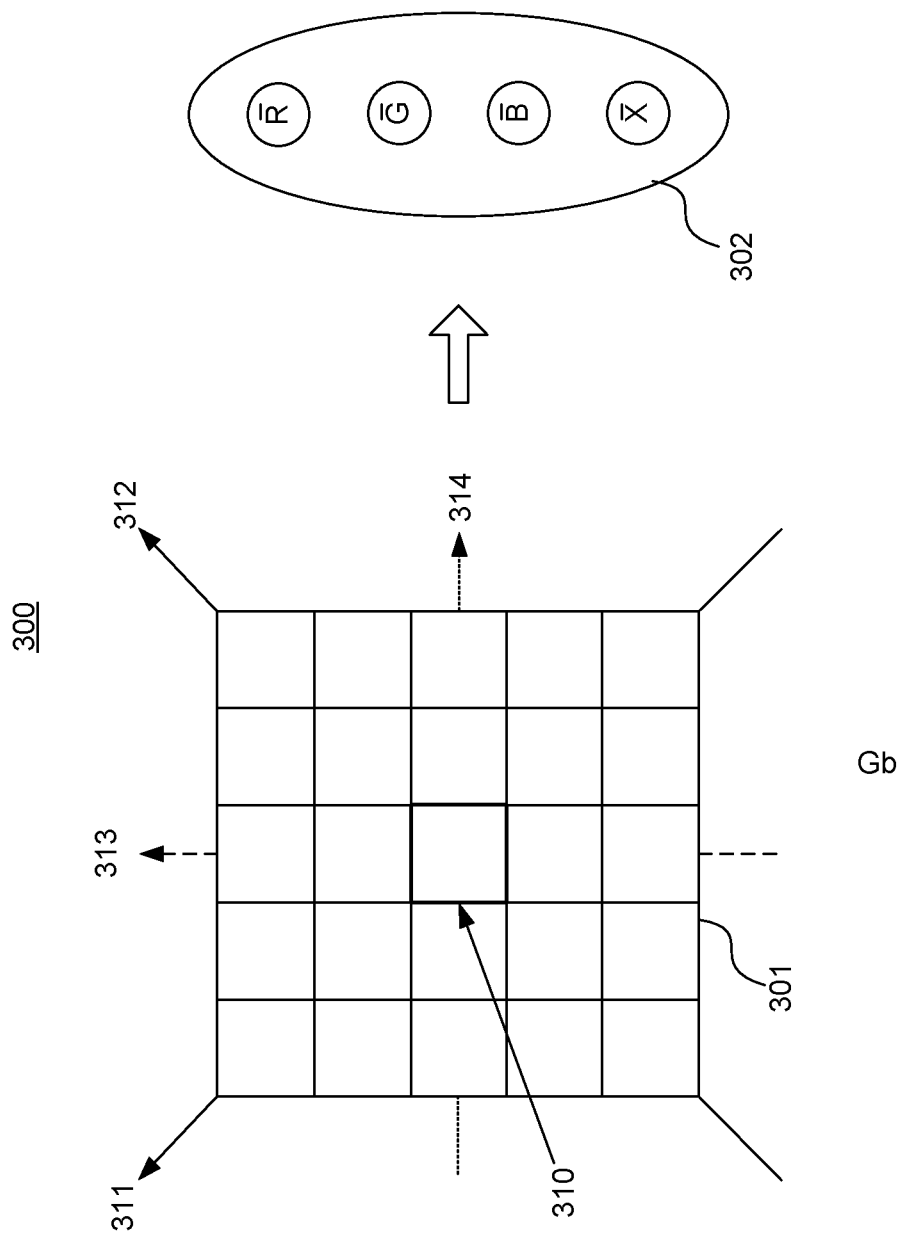
FIG. 3 is an exemplary illustration of supporting dimensionality reduction for a neighborhood block, in accordance with various embodiments of the present invention.

FIG. 3 is an exemplary illustration of supporting dimensionality reduction for a neighborhood block, in accordance with various embodiments of the present invention. As shown in FIG. 3, an imaging process 300 can determine a characterization vector 302 based on a neighborhood block 301 with a center pixel 310, which can be either a denoising pixel or a denoising reference pixel.

In accordance with various embodiments of the present invention, the characterization vector 302 can include various color components that correspond to the different colors in a color model used by the image.

For example, when the image is an RGB image, the characterization vector 302 can include a component ($\overline{R}$) for the red color, a component ($\overline{G}$) for the green color, and a component ($\overline{B}$) for the blue color. Thus, the characterization vector 302 can be represented using the following equation.

$$P = [\overline{R}\ \overline{G}\ \overline{B}]^T$$

Additionally, the characterization vector can include a grayscale component ($\overline{X}$), in which case the characterization vector 302 can be represented using the following equation.

$$P = [\overline{R}\ \overline{G}\ \overline{B}\ \overline{X}]^T$$

In accordance with various embodiments of the present invention, different approaches can be employed for determining the various color components in the characterization vector 302.

For example, a color component in the characterization vector 302 can be determined based on the value for the color, which is associated with the center pixel 310 in the neighborhood block 301.

Furthermore, a non-selective averaging method can be used for determining a color component in the characterization vector 302.

The non-selective averaging method can be used for determining a color component in the characterization vector 302, when a set of pixels in the neighborhood block 301, having a color associated with the color component, constitute only one direction (e.g. 313 or 314) through the center pixel 310 of the neighborhood block 301.

Also, the non-selective averaging method can be used for determining a color component in the characterization vector 302, when a set of pixels in the neighborhood block 301, having a color associated with the color component, are substantially isotropic in the neighborhood block 301.

Additionally, a selective averaging method can be used for determining a color component in the characterization vector 302, when a set of pixels in the neighborhood pixel block 301, having a color associated with the color component, constitute multiple directions (e.g. 311-312) in the neighborhood block.

In accordance with various embodiments of the present invention, the imaging process 300 can support the selective averaging method based on the directional judgment. For example, the selective averaging method, which is gradient-based, can apply the averaging calculation on a subset of the pixels, having a color associated with the color component. Here, the subset of the pixels can be associated with the direction (311 or 312) with the minimum gradient in the neighborhood pixel block 301.

Figure 4:
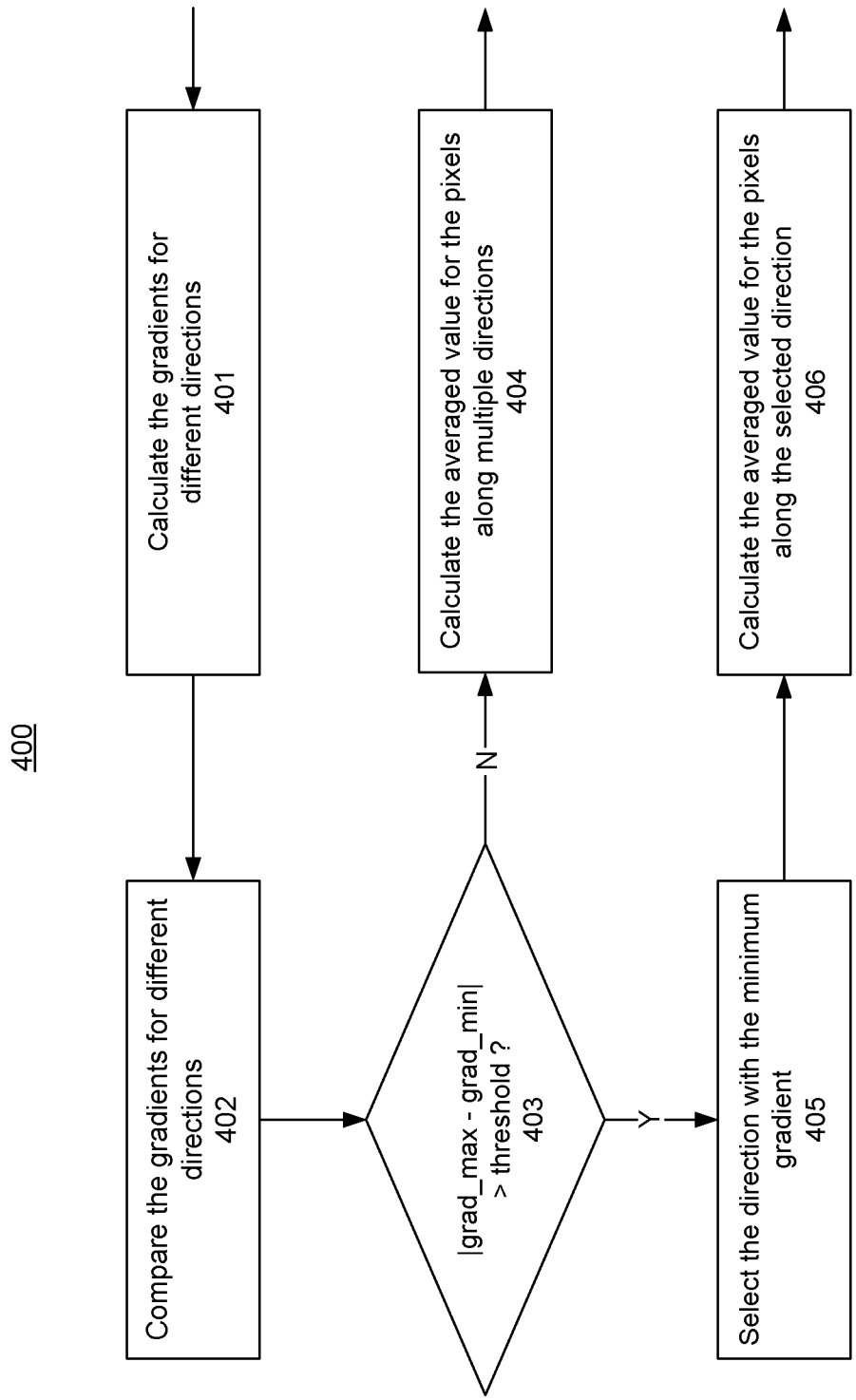
FIG. 4 is an exemplary illustration of using a selective averaging method for performing dimensionality reduction, in accordance with various embodiments of the present invention.

FIG. 4 is an exemplary illustration of using a selective averaging method for supporting dimensionality reduction, in accordance with various embodiments of the present invention. As shown in FIG. 4, an imaging process 400 can apply a selective averaging method on pixels with the same color in a neighborhood block, based on the directional judgment.

At step 401, the imaging process 400 can calculate the gradients for the pixels with same color along different directions in a neighborhood block. At step 402, the imaging process 400 can compare the gradients for different directions to obtain the maximum gradient (e.g. grad_max) and the minimum gradient (e.g. grad_min).

At step 403, the imaging process 400 can compare the difference between the maximum gradient and the minimum gradient (i.e., |grad_max−grad_min|) with a threshold (e.g., TH).

At step 404, if the difference between the maximum gradient and the minimum gradient is less or equal to the threshold (i.e., |grad_max−grad_min|<=TH), the imaging process 400 can use a non-selective averaging method to calculate the average value for the pixels along multiple directions.

Otherwise, (i.e., if |grad_max−grad_min|>TH), at step 405, the imaging process 400 select the pixels along the direction with the minimum gradient. Then, at step 406, the imaging process 400 can calculate the average value for the pixels along the selected direction (i.e., the pixels along the direction with the minimum gradient).

FIGS. 5(a)-(d) illustrate different types of exemplary neighborhood blocks in an RGB image, in accordance with various embodiments of the present invention. FIG. 5A shows a three-by-three (3×3) neighborhood block with a red color pixel (R) locating at the center of the neighborhood block. FIG. 5B shows a three-by-three (3×3) neighborhood block with a green color pixel (Gr) locating at the center of the neighborhood block. FIG. 5C shows a three-by-three (3×3) neighborhood block with a blue color pixel (B) locating at the center of the neighborhood block. FIG. 5D shows a three-by-three (3×3) neighborhood block with a green color pixel (Gb) locating at the center of the neighborhood block.

Figure 6:
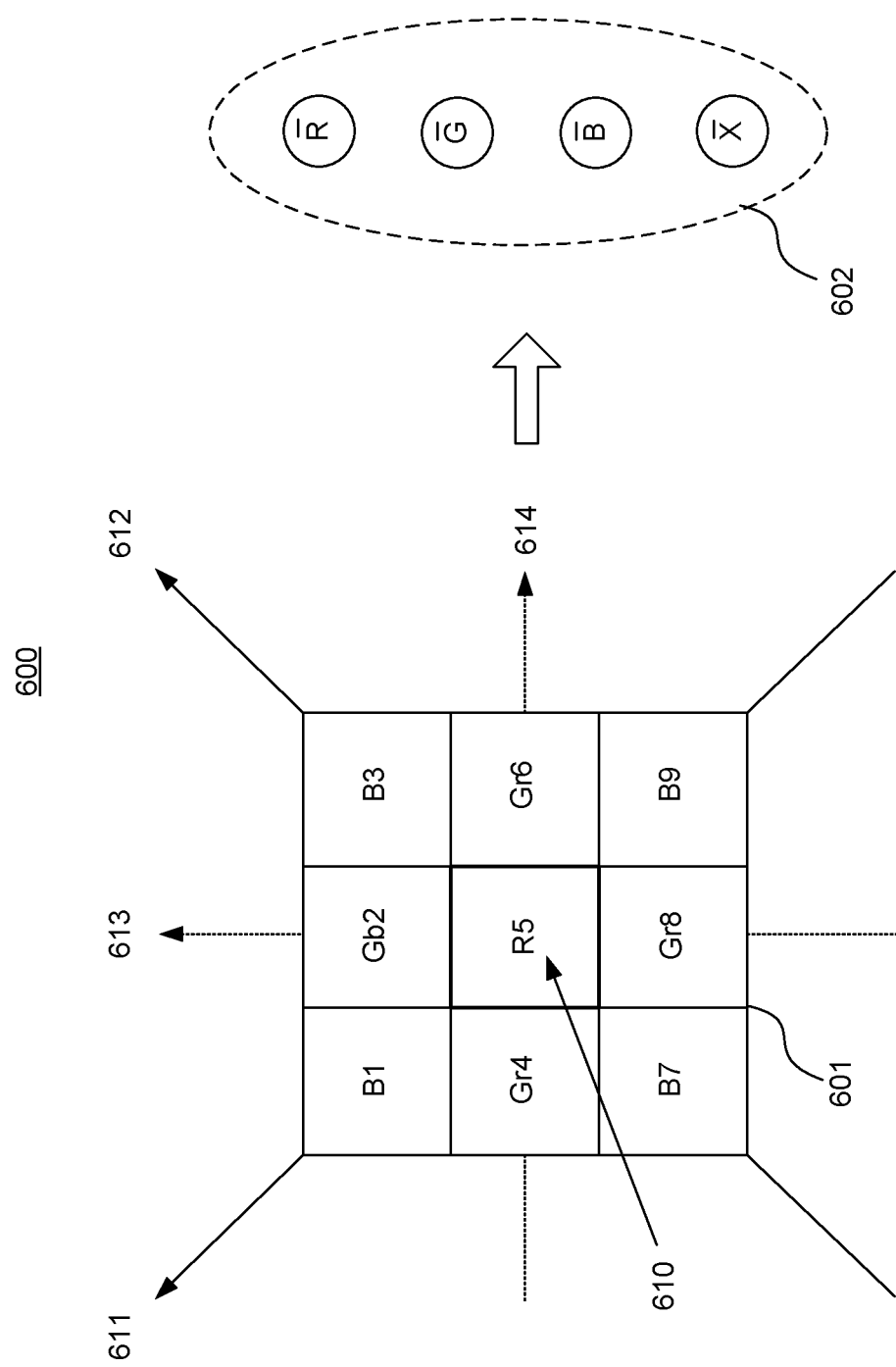
FIG. 6 is an exemplary illustration of supporting dimensionality reduction for a neighborhood block in FIG. 5A, in accordance with various embodiments of the present invention.

FIG. 6 is an exemplary illustration of supporting dimensionality reduction for a neighborhood block in FIG. 5A, in accordance with various embodiments of the present invention. As shown in FIG. 6, an imaging process 600 can determine a characterization vector 602 for a neighborhood block 601 in an RGB image.

The characterization vector 602 can include various color components, such as a component associated with the red color ($\bar{R}$), a component associated with the green color ($\bar{G}$), a component associated with the blue color ($\bar{B}$).

As shown in FIG. 6, the center pixel 610 in the neighborhood block 601 is a red color pixel (R5). Thus, the component associated with the red color ($\bar{R}$) in the characterization vector 602 can be determined based on the value of the red color pixel, R5.

Additionally, the blue color pixels (B1, B3, B7 and B9) in the neighborhood block 601 constitute multiple directions through the center pixel (R5) 610. As shown in FIG. 6, the direction 611 involves the blue color pixels (B1 and B9) and the direction 612 involves the blue color pixels (B3 and B7).

In order to determine the component associated with the blue color ($\bar{B}$), the imaging process 600 can calculate a gradient (e.g. grad_B1) for the direction 611 and a gradient (e.g. grad_B2) for the direction 612. Then, the imaging process 600 can determine the maximum gradient (e.g. grad_max) and the minimum gradient (e.g. grad_min) based on the gradients, grad_B1 and grad_B2.

If |grad_max−grad_min|>TH, the imaging process 600 can use the selective averaging method for determining the component associated with the blue color ($\bar{B}$). For example, the imaging process 600 can select the blue pixels (B1 and B9), if the grad_B1 along the direction 611 is less than the grad_B2 along the direction 612. Also, the imaging process 600 can select the blue pixels (B3 and B7), if the grad_B1 along the direction 611 is larger than the grad_B2 along the direction 612. The imaging process 600 can select either the blue pixels (B1 and B9) or the blue pixels (B3 and B7), if the grad_B1 along the direction 611 is equal to the grad_B2 along the direction 612. Then, the imaging process 600 can use the average value for the selected blue pixels for determining the component associated with the blue color ($\bar{B}$).

Otherwise, if |grad_max−grad_min|<=TH, the imaging process 600 can use the non-selective averaging method for determining the component associated with the blue color ($\bar{B}$) based on the average value for the blue pixels (B1, B3, B7, and B9) in the neighborhood block 601.

Also as shown in FIG. 6, the green color pixels (Gb2, Gr4, Gr6 and Gb8) in the neighborhood block 601 constitute multiple directions through the center pixel (R5) 610. The direction 613 involves the green color pixels (Gb2 and Gb8) and the direction 614 involves the green color pixels (Gr4 and Gr6).

In order to determine the component associated with the green color ($\bar{G}$), the imaging process 600 can calculate a gradient (e.g. grad_G1) for the direction 613 and a gradient (e.g. grad_G2) for the direction 614. Then, the imaging process 600 can determine the maximum gradient (e.g. grad_max) and the minimum gradient (e.g. grad_min) based on the gradients, grad_G1 and grad_G2.

If |grad_max−grad_min|>TH, the imaging process 600 can use the selective averaging method for determining the component associated with the blue color ($\bar{G}$). For example, the imaging process 600 can select the green pixels (Gb2 and Gb8), if the grad_G1 along the direction 613 is less than the grad_G2 along the direction 614. Also, the imaging process 600 can select the green pixels (Gr4 and Gr 6), if the grad_G1 along the direction 613 is larger than the grad_G2 along the direction 614. The imaging process 600 can select either the green pixels (Gb2 and Gb8) or the green pixels (Gr4 and Gr6), if the grad_G1 along the direction 613 is equal to the grad_G2 along the direction 614. Then, the imaging process 600 can use the average value for the selected blue pixels for determining the component associated with the green color ($\bar{G}$).

Otherwise, if |grad_max−grad_min|<=TH, the imaging process 600 can use the non-selective averaging method for determining the component associated with the green color ($\bar{G}$) based on the average value for the green pixels (Gb2, Gr4, Gr6 and Gb8) in the neighborhood block 601.

Thus, the characterization vector 602 can be represented using the following equation.

$$P=[\bar{R}\ \bar{G}\ \bar{B}]^T$$

Additionally, the characterization vector 602 may include a component associated with the grayscale ($\bar{X}$), which can be defined using the following equation.

$$\bar{X}=(\bar{R}+2\times\bar{G}+\bar{B})>>2$$

As shown in the above, the grayscale component ($\bar{X}$) accounts for the contribution from the different color components, i.e. the contribution by the red color component ($\bar{R}$), the contribution by the green color component ($\bar{G}$), and the contribution by the blue color component ($\bar{B}$).

Thus, the characterization vector 602 can be represented using the following equation.

$$P=[\bar{R}\ \bar{G}\ \bar{B}\ \bar{X}]^T$$

Figure 7:
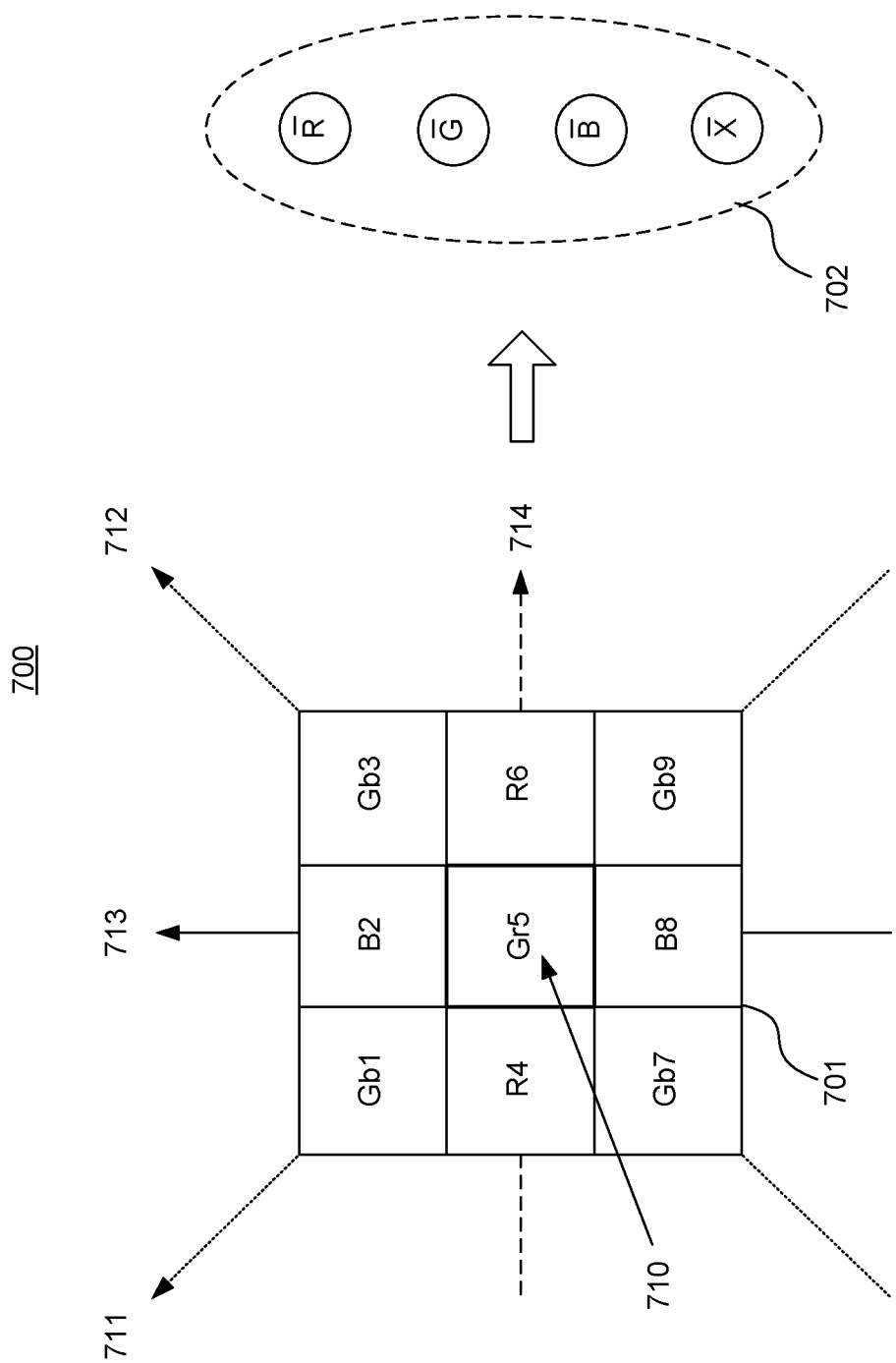
FIG. 7 is an exemplary illustration of supporting dimensionality reduction for a neighborhood block in FIG. 5B, in accordance with various embodiments of the present invention.

FIG. 7 is an exemplary illustration of supporting dimensionality reduction for a neighborhood block in FIG. 5B, in accordance with various embodiments of the present invention. As shown in FIG. 7, an imaging process 700 can determine a characterization vector 702 for a neighborhood block 701 in an RGB image.

The characterization vector 702 can include different components, such as a component associated with the red color ($\overline{R}$), a component associated with the green color ($\overline{G}$), a component associated with the blue color ($\overline{B}$).

As shown in FIG. 7, the center pixel 710 of the neighborhood block 701 is a green color pixel (Gr5). Thus, the component associated with the green color ($\overline{G}$) can be determined based on the value of the green color pixel, Gr5.

Furthermore, the blue color pixels (B2 and B8) constitute a single direction 713 in the neighborhood block 701. Thus, the component associated with the blue color ($\overline{B}$) can be determined based on the average value for the blue color pixels (B2 and B8) along the direction 713 in the neighborhood block 701.

Additionally, the red color pixels (R4 and R6) constitute a single direction 714 in the neighborhood block 701. Thus, the component associated with the red color ($\overline{R}$) can be determined based on the average value for the red color pixels (R4 and R6) along the direction 714 in the neighborhood block 701.

Thus, the characterization vector 702 can be represented using the following equation.

$$P=[\overline{R}\ \overline{G}\ \overline{B}]^T$$

Additionally, the characterization vector 702 may include a component associated with the grayscale ($\overline{X}$), as defined in the following equation.

$$\overline{X}=(\overline{R}+2\times\overline{G}_{edge}+\overline{B})>>2$$

As shown in the above, the grayscale component ($\overline{X}$) accounts for the contribution from the different color components, i.e. the contribution by the red color component ($\overline{R}$), the contribution by the green color component ($\overline{G}_{edge}$) and the contribution by the blue color component ($\overline{B}$).

As shown in FIG. 7, the green color pixels (Gb1, Gb3, Gb7, and Gb9) in the neighborhood block 701 constitute multiple direction through the center pixel (Gr5) 710. The imaging process 700 can calculate a gradient (e.g. grad_G1) for the direction 711 and a gradient (e.g. grad_G2) for the direction 712. Then, the imaging process 700 can determine the maximum gradient (e.g. grad_max) and the minimum gradient (e.g. grad_min) based on the gradients, grad_G1 and grad_G2.

If |grad_max−grad_min|>TH, the imaging process 700 can use the selective averaging method for determining the contribution by the green color component ($\overline{G}_{edge}$). For example, the imaging process 700 can select the green pixels (Gb1 and Gb9), if the grad_G1 along the direction 711 is less than the grad_G2 along the direction 712. Also, the imaging process 700 can select the green pixels (Gb3 and Gb7), if the grad_G1 along the direction 711 is larger than the grad_G2 along the direction 712. The imaging process 700 can select either the green pixels (Gb1 and Gb9) or the green pixels (Gb3 and Gb7), if the grad_G1 along the direction 711 is equal to the grad_G2 along the direction 712. Then, the imaging process 700 can use the average value for the selected blue pixels for determining the contribution by the green color component ($\overline{G}_{edge}$).

Otherwise, if |grad_max−grad_min|<=TH, the imaging process 700 can use the non-selective averaging method for determining the contribution by the green color component ($\overline{G}_{edge}$) based on the average value for all green pixels (Gb1, Gb3, Gb7, and Gb9) in the neighborhood block 701.

Accordingly, the characterization vector 702 can be represented using the following equation.

$$P=[\overline{R}0\overline{G}\ \overline{B}\ \overline{X}]^T$$

Figure 8:
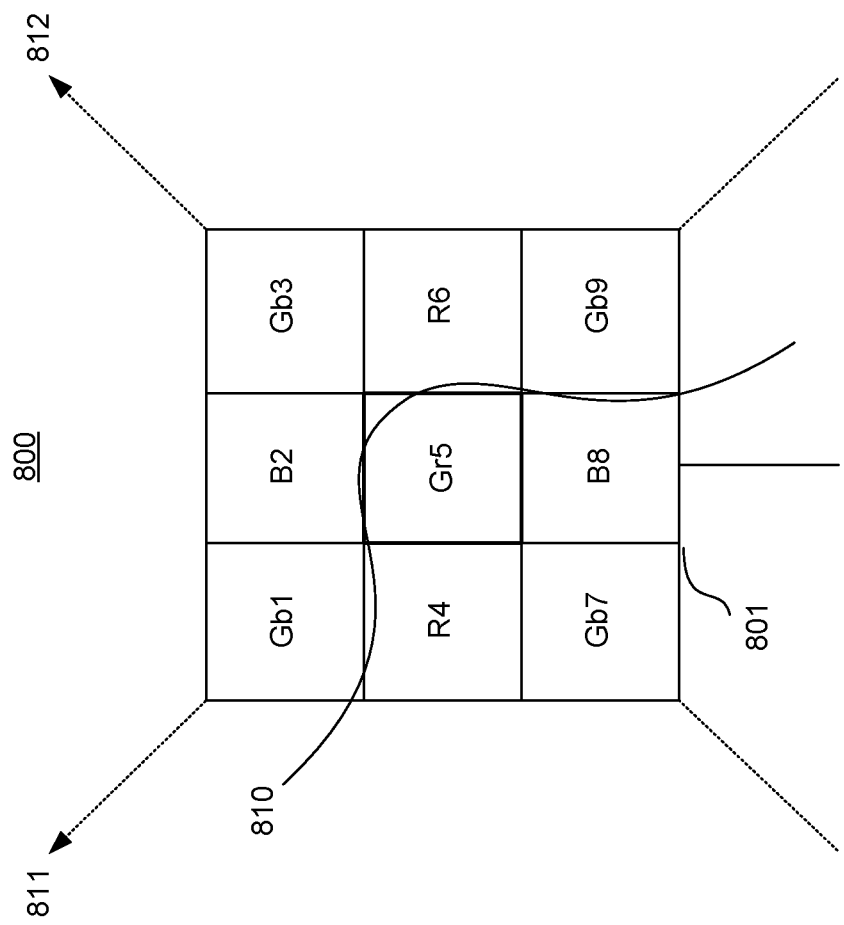
FIG. 8 is an exemplary illustration of preserving an edge line in a neighborhood block, in accordance with various embodiments of the present invention.

FIG. 8 is an exemplary illustration of preserving an edge line in a neighborhood block, in accordance with various embodiments of the present invention. As shown in FIG. 8, an edge line 810 in an RGB image may cross through a neighborhood block 801 with a green center pixel (Gr5).

For example, the pixels (Gb1, B2, Gb3, R6, and Gb9) may locate on the light color side, while the pixels (R4, Gr5, Gb7, and B8) locates on the dark color side. Thus, the gradient along the direction 811, which involves the green pixels (Gb1 and Gb9) locating on the same side of the edge line 810, should be less than the gradient along the direction 812, which involves the green pixels (Gb3 and Gb7) locating on the opposite sides of the edge line 810.

Using the selective averaging method, the green color contribution to the grayscale ($\overline{G}_{edge}$) can be determined based on the average value of the green pixels (Gb1 and Gb9).

On the other hand, the component associated with the green color ($\overline{G}$) can be determined based on the value of the green color center pixel (Gr5), which is likely larger than the average value of Gb1 and Gb9 (i.e. $\overline{G}_{edge}$).

As a result, the imaging process 800 can avoid smoothing out the green color center pixel (Gr5), which ensures that the edge line 810 is preserved, during the denoising operation.

Figure 9:
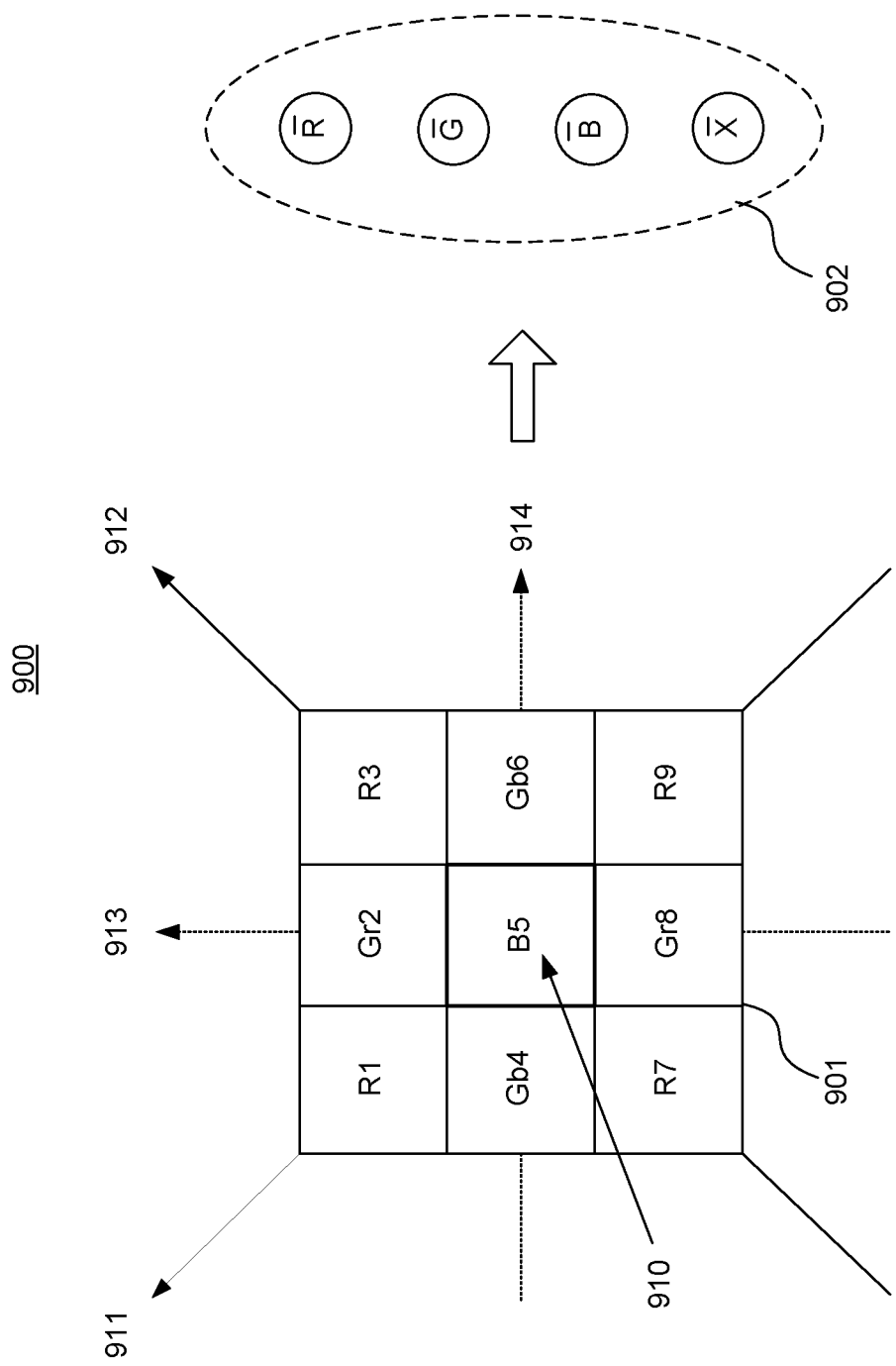
FIG. 9 is an exemplary illustration of supporting dimensionality reduction for a neighborhood block in FIG. 5C, in accordance with various embodiments of the present invention.

FIG. 9 is an exemplary illustration of supporting dimensionality reduction for a neighborhood block in FIG. 5C, in accordance with various embodiments of the present invention. As shown in FIG. 9, an imaging process 900 can determine a characterization vector 902 for a neighborhood block 901 in an RGB image.

The characterization vector 902 can include various color components, such as a component associated with the red color ($\overline{R}$), a component associated with the green color ($\overline{G}$), a component associated with the blue color ($\overline{B}$).

As shown in FIG. 9, the center pixel 910 in the neighborhood block 901 is a blue color pixel (B5). Thus, the component associated with the blue color ($\overline{B}$) in the characterization vector 902 can be determined based on the value of the blue color pixel, B5.

Additionally, the red color pixels (R1, R3, R7 and R9) in the neighborhood block 901 constitute multiple directions through the center pixel (B5) 910. As shown in FIG. 9, the direction 911 involves the red color pixels (R1 and R9) and the direction 912 involves the red color pixels (R3 and R7).

In order to determine the component associated with the red color ($\overline{R}$), the imaging process 900 can calculate a gradient (e.g. grad_R1) for the direction 911 and a gradient (e.g. grad_R2) for the direction 912. Then, the imaging process 900 can determine the maximum gradient (e.g. grad_max) and the minimum gradient (e.g. grad_min) based on the gradients, grad_R1 and grad_R2.

If |grad_max−grad_min|>TH, the imaging process 900 can use the selective averaging method for determining the component associated with the red color ($\overline{R}$). For example, the imaging process 900 can select the red pixels (R1 and R9), if the grad_R1 along the direction 911 is less than the grad_R2 along the direction 912. Also, the imaging process 900 can select the red pixels (R3 and R7), if the grad_R1 along the direction 911 is larger than the grad_R2 along the direction 912. The imaging process 900 can select either the red pixels (R1 and R9) or the red pixels (R3 and R7), if the grad_R1 along the direction 911 is equal to the grad_R2 along the direction 912. Then, the imaging process 900 can use the average value for the selected red pixels to determine the component associated with the red color ($\overline{R}$).

Otherwise, if |grad_max−grad_min|<=TH, the imaging process 900 can use the non-selective averaging method for determining the component associated with the red color ($\overline{R}$) based on the average value for the red pixels (R1, R3, R7, and R9) in the neighborhood block 901.

Also as shown in FIG. 9, the green color pixels (Gr2, Gb4, Gb6 and Gr8) in the neighborhood block 901 constitute multiple directions through the center pixel (B5) 910. The direction 913 involves the green color pixels (Gr2 and Gr8) and the direction 914 involves the green color pixels (Gb4 and Gb6).

In order to determine the component associated with the green color ($\overline{G}$), the imaging process 900 can calculate a gradient (e.g. grad_G1) for the direction 913 and a gradient (e.g. grad_G2) for the direction 914. Then, the imaging process 900 can determine the maximum gradient (e.g. grad_max) and the minimum gradient (e.g. grad_min) based on the gradients, grad_G1 and grad_G2.

If |grad_max−grad_min|>TH, the imaging process 900 can use the selective averaging method for determining the component associated with the green color ($\overline{G}$). For example, the imaging process 600 can select the green pixels (Gr2 and Gr8), if the grad_G1 along the direction 913 is less than the grad_G2 along the direction 914. Also, the imaging process 900 can select the green pixels (Gb4 and Gb6), if the grad_G1 along the direction 913 is larger than the grad_G2 along the direction 914. The imaging process 900 can select either the green pixels (Gr2 and Gr8) or the green pixels (Gb4 and Gb6), if the grad_G1 along the direction 913 is equal to the grad_G2 along the direction 914. Then, the imaging process 900 can use the average value for the selected green pixels for determining the component associated with the green color ($\overline{G}$).

Otherwise, if |grad_max−grad_min|<=TH, the imaging process 900 can use the non-selective averaging method for determining the component associated with the green color ($\overline{G}$) based on the average value for the green pixels (Gr2, Gb4, Gb6 and Gr8) in the neighborhood block 901.

Thus, the characterization vector 902 can be represented as in the following.

$$P=[\overline{R}\ \overline{G}\ \overline{B}]^T$$

Additionally, the characterization vector 902 may include a component associated with the grayscale ($\overline{X}$), which can be defined using the following equation.

$$\overline{X}=(\overline{R}+2=\overline{G}+\overline{B})>>2$$

As shown in the above, the grayscale component ($\overline{X}$) accounts for the contribution from the different color components, i.e. the contribution by the red color component ($\overline{R}$), the contribution by the green color component ($\overline{G}$), and the contribution by the blue color component ($\overline{B}$).

Thus, the characterization vector 602 can be represented using the following equation.

$$P=[\overline{R}\ \overline{G}\ \overline{B}\ \overline{X}]^T$$

Figure 10:
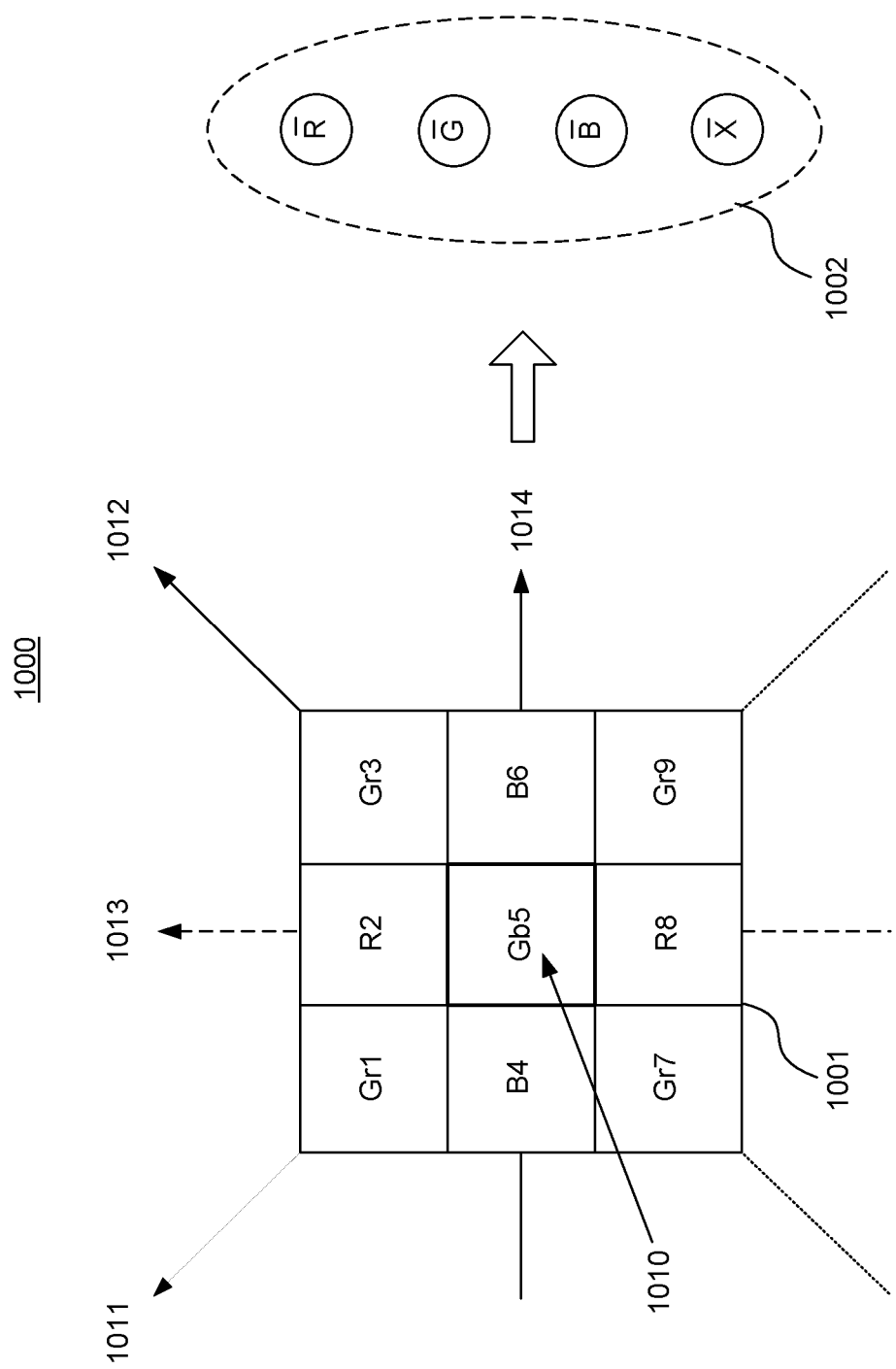
FIG. 10 is an exemplary illustration of supporting dimensionality reduction for a neighborhood block in FIG. 5D, in accordance with various embodiments of the present invention.

FIG. 10 is an exemplary illustration of supporting dimensionality reduction for a neighborhood block in Figure, in accordance with various embodiments of the present invention. As shown in FIG. 10, an imaging process 1000 can determine a characterization vector 1002 for a neighborhood block 1001 in an RGB image.

The characterization vector 1002 can include different components, such as a component associated with the red color ($\overline{R}$), a component associated with the green color ($\overline{G}$), a component associated with the blue color ($\overline{B}$).

As shown in FIG. 10, the center pixel 1010 of the neighborhood block 1001 is a green color pixel (Gb5). Thus, the component associated with the green color ($\overline{G}$) can be determined based on the value of the green color pixel, Gb5.

Furthermore, the red color pixels (R2 and R8) constitute a single direction 1013 in the neighborhood block 1001. Thus, the component associated with the red color ($\overline{R}$) can be determined based on the average value for the blue color pixels (R2 and R8) along the direction 1013 in the neighborhood block 1001.

Additionally, the blue color pixels (B4 and B6) constitute a single direction 1014 in the neighborhood block 1001. Thus, the component associated with the blue color ($\overline{B}$) can be determined based on the average value for the blue color pixels (B4 and B6) along the direction 1014 in the neighborhood block 1001.

Thus, the characterization vector 1002 can be represented using the following equation.

$$P=[\overline{R}\ \overline{G}\ \overline{B}]^T$$

Additionally, the characterization vector 1002 may include a component associated with the grayscale ($\overline{X}$), as defined in the following equation.

$$\overline{X}=(\overline{R}+2\times\overline{G}_{edge}+\overline{B})>>2$$

As shown in the above, the grayscale component ($\overline{X}$) accounts for the contribution from the different color components, i.e. the contribution by the red color component ($\overline{R}$), the contribution by the green color component ($\overline{G}_{edge}$), and the contribution by the blue color component ($\overline{B}$).

As shown in FIG. 10, the green color pixels (Gr1, Gr3, Gr7, and Gr9) in the neighborhood block 1001 constitute multiple direction through the center pixel (Gb5) 1010. The imaging process 1000 can calculate a gradient (e.g. grad_G1) for the direction 1011 and a gradient (e.g. grad_G2) for the direction 1012. Then, the imaging process 1000 can determine the maximum gradient (e.g. grad_max) and the minimum gradient (e.g. grad_min) based on the gradients, grad_G1 and grad_G2.

If |grad_max−grad_min|>TH, the imaging process 1000 can use the selective averaging method for determining the contribution by the green color component ($\overline{G}_{edge}$). For example, the imaging process 1000 can select the green pixels (Gr1 and Gr9), if the grad_G1 along the direction 1011 is less than the grad_G2 along the direction 1012. Also, the imaging process 1000 can select the green pixels (Gr3 and Gr7), if the grad_G1 along the direction 1011 is larger than the grad_G2 along the direction 1012. The imaging process 1000 can select either the green pixels (Gr1 and Gr9) or the green pixels (Gr3 and Gr7), if the grad_G1 along the direction 1011 is equal to the grad_G2 along the direction 1012. Then, the imaging process 1000 can use the average value for the selected blue pixels for determining contribution by the green color component ($\overline{G}_{edge}$).

Otherwise, if |grad_max−grad_min|<=TH, the imaging process 1000 can use the non-selective averaging method for determining the contribution by the green color component ($\overline{G}_{edge}$) based on the average value for all green pixels (Gr1, Gr3, Gr7, and Gr9) in the neighborhood block 1001.

Accordingly, the characterization vector 1002 can be represented using the following equation.

$$P=[\overline{R}\ \overline{G}\ \overline{B}\ \overline{X}]^T$$

As a result, the imaging process 1000 can avoid smoothing out the green color center pixel (Gb5) and can preserve a edge line during the denoising operation.

Figure 11:
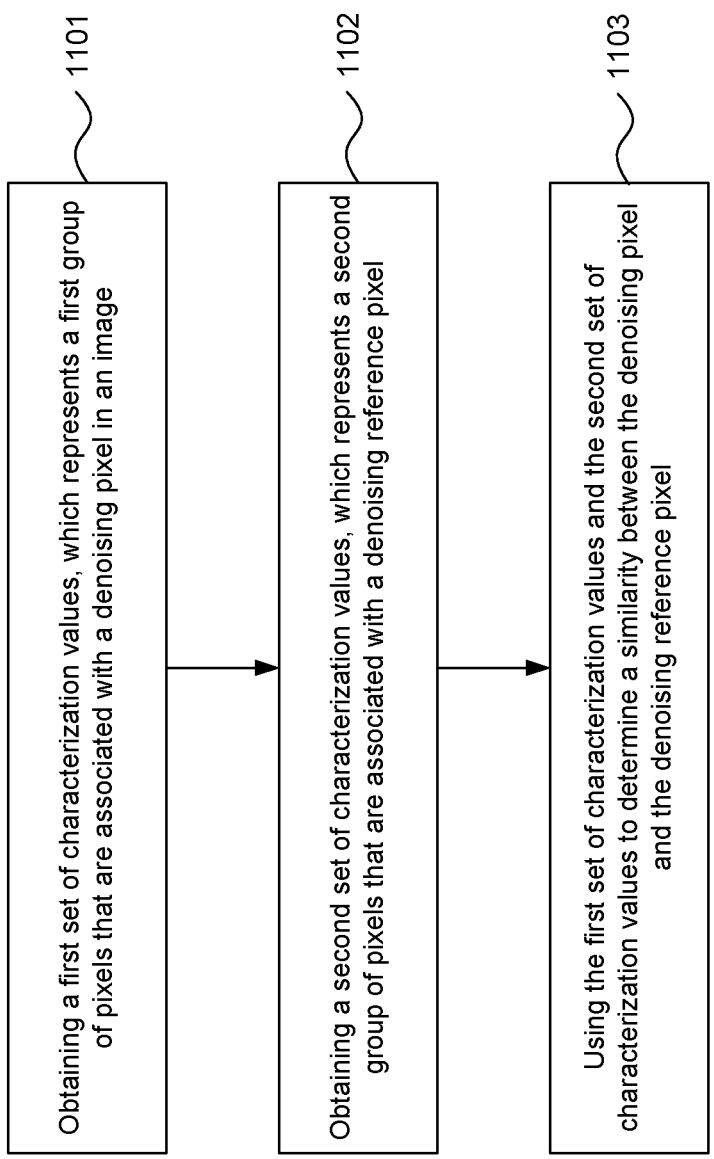
FIG. 11 shows a flowchart of supporting image denoising based on neighborhood block dimensionality reduction, in accordance with various embodiments of the present invention.

FIG. 11 shows a flowchart of supporting image denoising based on neighborhood block dimensionality reduction, in accordance with various embodiments of the present invention. As shown in FIG. 11, at step 1101, an imaging process can obtain a first set of characterization values, which represents a first group of pixels that are associated with a denoising pixel in an image. Furthermore, at step 1102, the imaging process can obtain a second set of characterization values, which represents a second group of pixels that are associated with a denoising reference pixel. Then, at step 1103, the imaging process can use the first set of characterization values and the second set of characterization values to determine a similarity between the denoising pixel and the denoising reference pixel.

Many features of the present invention can be performed in, using, or with the assistance of hardware, software, firmware, or combinations thereof. Consequently, features of the present invention may be implemented using a processing system (e.g., including one or more processors). Exemplary processors can include, without limitation, one or more general purpose microprocessors (for example, single or multi-core processors), application-specific integrated circuits, application-specific instruction-set processors, graphics processing units, physics processing units, digital signal processing units, coprocessors, network processing units, audio processing units, encryption processing units, and the like.

Features of the present invention can be implemented in, using, or with the assistance of a computer program product which is a storage medium (media) or computer readable medium (media) having instructions stored thereon/in which can be used to program a processing system to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the machine readable medium (media), features of the present invention can be incorporated in software and/or firmware for controlling the hardware of a processing system, and for enabling a processing system to interact with other mechanism utilizing the results of the present invention. Such software or firmware may include, but is not limited to, application code, device drivers, operating systems and execution environments/containers.

Features of the invention may also be implemented in hardware using, for example, hardware components such as application specific integrated circuits (ASICs) and field-programmable gate array (FPGA) devices. Implementation of the hardware state machine so as to perform the functions described herein will be apparent to persons skilled in the relevant art.

Additionally, the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the invention.

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. An image processing method, comprising:
   obtaining a set of characterization values, which represents a first group of pixels that are associated with a denoising pixel in a filter window of an image, wherein obtaining the set of characterization values includes determining a component in the set of characterization values based on a value associated with one or more pixels in a first neighborhood block formed by the first group of pixels;
   using the set of characterization values to determine a similarity between the denoising pixel and a denoising reference pixel in a second neighborhood block formed by a second group of pixels in the filter window of the image; and
   calculating a denoised value for the denoising pixel based on the determined similarity between the denoising pixel and the denoising reference pixel.

2. The image processing method of claim 1, wherein the filter window includes a plurality of denoising reference pixels.

3. The image processing method of claim 1, further comprising:
   calculating a plurality of weights for the plurality of denoising reference pixels in the filter window, wherein each said weight is associated with a different denoising reference pixel, and wherein each said weight is determined based on a similarity between the denoising pixel and said each denoising reference pixel; and
   using the plurality of weights that are associated with the plurality of denoising reference pixels to calculate a denoised value for the denoising pixel.

4. The image processing method of claim 1, wherein:
   the image is based on a color model, and wherein the set of characterization values includes a plurality of color components, with each color component associated with a different color in the color model.

5. The image processing method of claim 4, wherein:
the set of characterization values includes a grayscale component in addition to the plurality of color components that are associated with the different colors in the color model.

6. The image processing method of claim 4, wherein determining the component in the set of characterization values further includes determining a color component based on a value for a color associated with a center pixel in the first neighborhood block.

7. The image processing method of claim 4, further comprising:
using a non-selective averaging method to determine a color component in the set of characterization values, which represent the first neighborhood block in the filter window, when a set of pixels in the first neighborhood block, having a color associated with the color component, constitute only one direction in the first neighborhood block through a center pixel of the first neighborhood block.

8. The image processing method of claim 4, further comprising:
using a non-selective averaging method to determine a color component in the set of characterization values, which represent the first neighborhood block in the filter window, when a set of pixels in the first neighborhood block, having a color associated with the color component, are substantially isotropic in the first neighborhood block.

9. The image processing method of claim 4, further comprising:
using a selective averaging method, which is gradient-based, to determine a color component in the set of characterization values, which represent the first neighborhood block in the filter window, when a set of pixels in the first neighborhood block, having a color associated with the color component, constitute multiple directions in the first neighborhood block.

10. The image processing method of claim 9, wherein:
the selective averaging method operates to calculate an averaged value for one or more pixels having a color associated with the color component in the first neighborhood block, wherein the one or more pixels are selected from the set of pixels along a direction, with a minimum gradient, through a center pixel of the first neighborhood block.

11. The image processing method of claim 9, further comprising:
configuring a threshold parameter; and
obtaining an average value for the set of pixels in the first neighborhood block to determine the color component in the set of characterization values, when a gradient difference among said multiple directions in the first neighborhood block is less than a value of the threshold parameter.

12. The image processing method of claim 4, wherein:
the color model is a RGB color model and the image is a Bayer image.

13. The image processing method of claim 12, further comprising:
using a grayscale component to handle an edge effect in the first neighborhood block with a green center pixel.

14. An image processing system, comprising:
one or more microprocessors;
the imaging process running on the one or more microprocessors, wherein the imaging process operates to:
obtain a set of characterization values, which represents a first group of pixels that are associated with a denoising pixel in a filter window of an image, wherein obtaining the set of characterization values includes determining a component in the set of characterization values based on a value associated with one or more pixels in a first neighborhood block formed by the first group of pixels;
use the set of characterization values to determine a similarity between the denoising pixel and a denoising reference pixel in a second neighborhood block formed by a second group of pixels in the filter window of the image; and
calculate a denoised value for the denoisinq pixel based on the determined similarity between the denoisinq pixel and the denoisinq reference pixel.

15. The image processing system of claim 14, wherein the filter window includes a plurality of denoising reference pixels.

16. The image processing system of claim 14, wherein:
the imaging process operates to:
calculate a plurality of weights for the plurality of denoising reference pixels in the filter window, wherein each said weight is associated with a different denoising reference pixel, and wherein each said weight is determined based on a similarity between the denoising pixel and said each denoising reference pixel; and
use the plurality of weights that are associated with the plurality of denoising reference pixels to calculate a denoised value for the denoising pixel.

17. The image processing system of claim 14, wherein:
the image is based on a color model, and wherein each said set of characterization values include a plurality of color components, with each color component associated with a different color in the color model.

18. The image processing system of claim 17, wherein:
the set of characterization values includes a grayscale component in addition to the plurality of color components that are associated with the different colors in the color model.

19. The image processing system of claim 17, wherein:
the imaging process operates to determine the component in the first set of characterization values based on a value for a color associated with a center pixel in the first neighborhood block.

20. The image processing system of claim 17, wherein:
the imaging process operates to use a non-selective averaging method to determine a color component in the set of characterization values, which represent the first neighborhood block in a filter window, when a set of pixels in the first neighborhood block, having a color associated with the color component, constitute only one direction in the first neighborhood block through a center pixel of the first neighborhood block.

21. The image processing system of claim 17, wherein:
the imaging process operates to use a non-selective averaging method to determine a color component in the set of characterization values, which represent the first neighborhood block in the filter window, when a set of pixels in the first neighborhood block, having a color associated with the color component, are substantially isotropic in the first neighborhood block.

22. The image processing system of claim 17, wherein:
the imaging process operates to use a selective averaging method, which is gradient-based, to determine a color component in the set of characterization values, which represent the first neighborhood block in the filter window, when a set of pixels in the first neighborhood block, having a color associated with the color component, constitute multiple directions in the first neighborhood block.

23. The image processing system of claim 22, wherein:
the selective averaging method operates to calculate an averaged value for one or more pixels having a color associated with the color component in the first neighborhood block, wherein the one or more pixels are selected from the set of pixels along a direction, with a minimum gradient, through a center pixel of the first neighborhood block.

24. The image processing system of claim 22, wherein:
the imaging process operates to
configure a threshold parameter; and
obtain an average value for the set of pixels in the first neighborhood block to determine the color component in the set of characterization values, when a gradient difference among said multiple directions in the first neighborhood block is less than a value of the threshold parameter.

25. The image processing system of claim 17, wherein:
the color model is a RGB color model and the image is a Bayer image.

26. The image processing system of claim 25, wherein:
the imaging process operates to use a grayscale component to handle an edge effect in the first neighborhood block with a green center pixel.

27. A non-transitory computer-readable medium with instructions stored thereon, that when executed by a processor, perform the steps comprising:
obtaining a set of characterization values, which represents a first group of pixels that are associated with a denoising pixel in a filter window of an image, wherein obtaining the set of characterization values includes determining a component in the set of characterization values based on a value associated with one or more pixels in a first neighborhood block formed by the first group of pixels;
using the set of characterization values to determine a similarity between the denoising pixel and a denoising reference pixel in a second neighborhood block formed by a second group of pixels in the filter window of the image; and
calculating a denoised value for the denoising pixel based on the determined similarity between the denoising pixel and the denoising reference pixel.

28. An image processing device, comprising:
a first processor to obtain a set of characterization values, which represents a first group of pixels that are associated with a denoising pixel in a filter window of an image, wherein obtaining the set of characterization values includes determining a component in the set of characterization values based on a value associated with one or more pixels in a first neighborhood block formed by the first group of pixels;
a second processor to use the set of characterization values to determine a similarity between the denoising pixel and a denoising reference pixel in a second neighborhood block formed by a second group of pixels in the filter window of the image; and
a third processor to calculate a denoised value for the denoising pixel based on the determined similarity between the denoising pixel and the denoising reference pixel.

* * * * *

UNITED STATES PATENT AND TRADEMARK OFFICE
CERTIFICATE OF CORRECTION

| | | |
|---|---|---|
| PATENT NO. | : 10,026,154 B2 | Page 1 of 1 |
| APPLICATION NO. | : 15/619121 | |
| DATED | : July 17, 2018 | |
| INVENTOR(S) | : Zisheng Cao et al. | |

It is certified that error appears in the above-identified patent and that said Letters Patent is hereby corrected as shown below:

Claim 14, Column 16, Line 14, Line 15, and Line 16, "denoisinq" should read --denoising--.

Signed and Sealed this
Second Day of October, 2018

Andrei Iancu
*Director of the United States Patent and Trademark Office*